US006503604B1

(12) United States Patent
Kasahara et al.

(10) Patent No.: US 6,503,604 B1
(45) Date of Patent: Jan. 7, 2003

(54) INK JET RECORDING SHEET

(75) Inventors: Kenzo Kasahara, Hachioji (JP); Yoshihiro Mochizuki, Koganei (JP); Yoichi Saito, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/423,335

(22) PCT Filed: Jun. 9, 1999

(86) PCT No.: PCT/JP99/03073

§ 371 (c)(1),
(2), (4) Date: Nov. 4, 1999

(87) PCT Pub. No.: WO99/64248

PCT Pub. Date: Dec. 16, 1999

(30) Foreign Application Priority Data

Jun. 10, 1998 (JP) .......................................... 10-178126

(51) Int. Cl.[7] ........................... B32B 27/14; B32B 3/00

(52) U.S. Cl. ....................... 428/195; 428/195; 428/206; 428/325; 428/411.1

(58) Field of Search ................................ 428/195, 206, 428/325, 411.1

(56) References Cited

U.S. PATENT DOCUMENTS

| | | | | | |
|---|---|---|---|---|---|
| 5,837,375 | A | * 11/1998 | Brault et al. | ............ | 428/411.1 |
| 6,063,836 | A | * 5/2000 | Ito et al. | ...................... | 523/161 |
| 6,083,609 | A | * 7/2000 | Susaki et al. | ............... | 428/195 |
| 6,140,406 | A | * 10/2000 | Schliesman et al. | ........ | 524/493 |
| 6,165,606 | A | * 12/2000 | Kasahara et al. | ........... | 428/323 |

FOREIGN PATENT DOCUMENTS

| | | |
|---|---|---|
| JP | 08 282092 | * 10/1996 |
| JP | 09 030112 | * 2/1997 |
| JP | 10 100397 | * 4/1998 |
| JP | 10 157283 | * 6/1998 |

OTHER PUBLICATIONS

English translation of Japanese Patent 8–282092–A.*

* cited by examiner

*Primary Examiner*—Bruce H. Hess
*Assistant Examiner*—B. Shewareged
(74) *Attorney, Agent, or Firm*—Frishauf, Holtz, Goodman & Chick, P.C.

(57) ABSTRACT

In an ink jet recording sheet having an ink absorptive layer comprising hydrophilic binder, fine particles having average particle diameter of not more than 200 nm and water soluble cationic polymer having specific structure, wherein the layer surface pH of said ink absorptive layer of 3 to 6.

13 Claims, No Drawings

INK JET RECORDING SHEET

FIELD OF THE INVENTION

The present invention relates to an ink jet recording sheet, and specifically to an ink jet recording sheet in which image blur, after printing, is reduced.

BACKGROUND OF THE INVENTION

Ink jet recording is carried out by ejecting micro-droplets employing various working principles and attaching them onto a recording sheet of paper and the like to record images, letters etc., and exhibits advantages such as relatively high speed, low noise, easy application for multicolor, etc. Conventional problems of this system regarding clogging of nozzles and maintenance have been solved by improving both aspects of ink and device, and at present, ink jet recording has been rapidly applied to a variety of fields such as various printers, facsimile machines, computer terminals, and the like.

Requirements for a recording sheet employed in such ink jet recording system is that the density of printed dots is high, color tone is bright and clear, ink is rapidly absorbed and when printed dots are superimposed, ink should neither run nor blot, the diffusion of a printed dot in the lateral direction should not be greater than needed, and the circumference should be smooth and result in no blurring; and the like.

Specifically, at low rates of ink absorption, when recording is carried out by superimposing at least two color ink droplets, on a recording sheet, droplets result in repellence to cause unevenness, and in the boundary area of different colors, different color inks blot with each other. As a result, image quality tends to be markedly degraded. Therefore, it is required that the recording sheet exhibits high ink absorbability.

In order to solve these problems, conventionally, a great number of techniques have been proposed.

For example, a recording sheet comprising pigments and fine silica particles having specified physical parameters described in Japanese Patent Publication Open to Public Inspection No. 3-27976, etc.; a recording sheet containing fine silica particles such as colloidal silica described in Japanese Patent Publication Open to Public Inspection No. 7-276789, etc.; a recording sheet containing fine hydrated alumina particles described in Japanese Patent Publication Open to Public Inspection No. 5-16517, etc., and the like.

These void type recording sheets are preferred in which fine voids are formed in the ink receptive layer employing fine inorganic particles and a hydrophilic binder because relatively high gloss is obtained, as high quality glossy sheets.

As such fine inorganic particles, fine silica particles having anionic surfaces are preferably employed, because excellent gloss is obtained. Of these, specifically preferred are composite particles having an average particle diameter of no more than 100 nm, which are prepared by combining fine silica particles with an average primary particle diameter of no more than 30 nm, synthesized employing a gas phase method, with a cationic polymer in terms of the possible coexistence of high gloss and void ratio.

Further, after ink jet recording, a problem occurs in which when recorded images are stored under high humidity, or water droplets adhere to images, images tend to blot.

In order to overcome this problem, a number of techniques have been proposed.

Japanese Patent Publication Open to Public Inspection No. 57-36692 describes the use of basic mordant latex; Japanese Patent Publication Open to Public Inspection No. 59-198188 describes a method of impregnating polyethyleneimine; and Japanese Patent Publication Open to Public Inspection No. 62-174184 describes the use of polyarylamine as a mordant.

Further, in Japanese Patent Publication Open to Public Inspection Nos. 6-234268, 7-125411, etc., many techniques are disclosed in which the dying affinity of an ink dye is improved by the addition of cationic mordants.

However, almost all of them disclosed in the prior art result in problems in which when mixed with fine inorganic particles with anionic surfaces, such as silica, coagula tend to be formed and good coating composition cannot be prepared, or the glossiness of a coated layer surface markedly decreases, and the like.

In order to improve this point, in the previous application (Japanese Patent Publication Open to Public Inspection No. 10-217601), the present applicants applied for a patent in which a water-soluble cationic polymer having an average molecular weight of no more than 500,000 was employed. Employing this, excellent water resistance and gloss have been obtained.

However, as a result of inspections since then, it was found that when within a relatively short period after printing with an ink jet printer, ink jet printed sheets were piled or stored in a clear file, etc., images tended to blot during aging. Thus, further improvement has been desired.

This blur during aging depends on the types of dyes in the employed ink, or the content of water-soluble high boiling point organic solvents. In addition, it has been found that the blur also depended on the dye fixability of recording sheets.

The present inventors are presenting the present invention having discovered that image blur after printing is improved by employing the specified structure of cationic polymers as well as the specified pH of the coated layer.

An object of the present invention is to provide an ink jet recording sheet in which in an ink jet recording sheet having a void layer comprised of fine inorganic particles as well as a hydrophilic binder, image blur after printing is reduced while maintaining high glossiness as well as a high void ratio.

DESCRIPTION OF THE INVENTION

The ink jet recording sheet of the invention is described.

1. An ink jet recording sheet comprising a support having thereon an ink-absorptive layer comprising a hydrophilic binder, fine inorganic particles having an average particle diameter of no more than 200 nm and a water-soluble cationic polymer represented by formula (1) described below, wherein pH of a surface of the ink-absorptive layer is 3 to 6.5.

Formula (1)

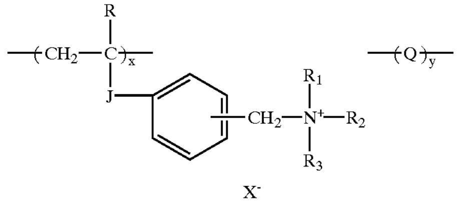

In the formula R represents a hydrogen atom or an alkyl group having 1 to 4 carbon atoms, $R_1$, $R_2$, and $R_3$ each independently represents an alkyl group, and J represents a divalent bonding group. $X^-$ represents an anion. Q represents a repeat unit, derived from a monomer having an ethylenic unsaturated group. Q includes the case in which at least two types of monomers are polymerized. x represents 40 to 100 mole percent and y represents 0 to 60 mole percent.

2. An ink jet recording sheet comprising a support having thereon an ink-absorptive layer comprising a hydrophilic binder, fine particles having an average particle diameter of no more than 200 nm which are formed by composing inorganic particles having an average primary particle diameter of no more than 30 nm, and a water-soluble cationic polymer represented by formula (1) described below, wherein pH of a surface of the ink-absorptive layer is 3 to 6.5.

Formula (1)

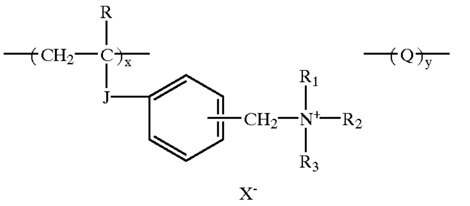

In the formula R represents a hydrogen atom or an alkyl group having 1 to 4 carbon atoms, $R_1$, $R_2$, and $R_3$ each independently represents an alkyl group, and J represents a divalent bonding group. $X^-$ represents an anion. Q represents a repeat unit, derived from a monomer having an ethylenic unsaturated group. Q includes the case in which at least two types of monomers are polymerized. x represents 40 to 100 mole percent and y represents 0 to 60 mole percent.

3. An ink jet recording sheet comprising a support having thereon an ink-absorptive layer comprising a hydrophilic binder, fine particles having an average particle diameter of no more than 200 nm which are formed by composing inorganic particles having an average primary particle diameter of no more than 30 nm, and a water-soluble cationic polymer represented by formula (1) described below, having an average molecular weight of no more than 100,000, wherein pH of a surface of the ink-absorptive layer is 3 to 6.

Formula (1)

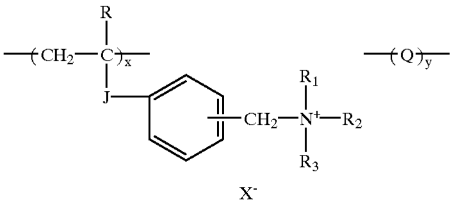

In the formula R represents a hydrogen atom or an alkyl group having 1 to 4 carbon atoms, $R_1$, $R_2$, and $R_3$ each independently represents an alkyl group, and J represents a divalent bonding group. $X^-$ represents an anion. Q represents a repeat unit, derived from a monomer having an ethylenic unsaturated group. Q includes the case in which at least two types of monomers are polymerized. x represents 50 to 100 mole percent and y represents 0 to 50 mole percent.

4. An ink jet recording sheet comprising a support having thereon an ink-absorptive layer comprising a hydrophilic binder, inorganic particles having an average primary particle diameter of no more than 30 nm, and a water-soluble cationic polymer represented by formula (1) described below, wherein pH of a surface of the ink-absorptive layer is 3 to 6.5.

Formula (1)

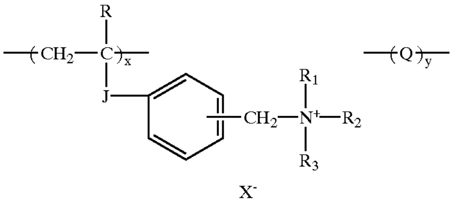

In the formula R represents a hydrogen atom or an alkyl group having 1 to 4 carbon atoms, $R_1$, $R_2$, and $R_3$ each independently represents an alkyl group, and J represents a divalent bonding group. $X^-$ represents an anion. Q represents a repeat unit, derived from a monomer having an ethylenic unsaturated group. Q includes the case in which at least two types of monomers are polymerized. x represents 40 to 100 mole percent and y represents 0 to 60 mole percent.

5. An ink jet recording sheet comprising a support having thereon an ink-absorptive layer comprising a hydrophilic binder, inorganic particles having an average primary particle diameter of no more than 30 nm, and a water-soluble cationic polymer represented by formula (1) described below, having an average molecular weight of no more than 100,000, wherein pH of a surface of the ink-absorptive layer is 3 to 6.

Formula (1)

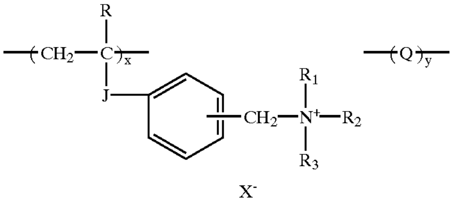

In the formula R represents a hydrogen atom or an alkyl group having 1 to 4 carbon atoms, $R_1$, $R_2$, and $R_3$ each independently represents an alkyl group, and J represents a divalent bonding group. $X^-$ represents an anion. Q represents a repeat unit, derived from a monomer having an ethylenic unsaturated group. Q includes the case in which at least two types of monomers are polymerized. x represents 50 to 100 mole percent and y represents 0 to 50 mole percent.

6. An ink jet recording sheet comprising a support having thereon an ink-absorptive layer comprising a hydrophilic binder, fine inorganic particles having an average particle diameter of no more than 200 nm and a water-soluble cationic polymer represented by formula (1) described below, and a cationic polymer other than the water-soluble cationic polymer represented by formula (1) described below, wherein pH of a surface of the ink-absorptive layer is 3 to 6.5.

Formula (1)

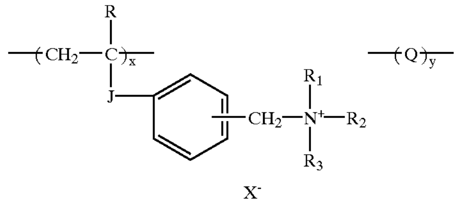

In the formula R represents a hydrogen atom or an alkyl group having 1 to 4 carbon atoms, $R_1$, $R_2$, and $R_3$ each independently represents an alkyl group, and J represents a divalent bonding group. $X^-$ represents an anion. Q represents a repeat unit, derived from a monomer having an ethylenic unsaturated group. Q includes the case in which at least two types of monomers are polymerized. x represents 40 to 100 mole percent and y represents 0 to 60 mole percent.

EMBODIMENTS OF THE INVENTION

The present invention will now be detailed below.

The ink-absorptive layer is a void type ink absorbing layer comprised of a hydrophilic binder and fine inorganic particles. Ink is considered to be absorbed in the voids formed between the fine particles, caused by providing a layer of the hydrophilic binder with fine particles formed by composing inorganic fine particles. Listed as examples of fine inorganic particles can be white inorganic pigments such as soft calcium carbonate, heavy calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, diatomaceous earth, calcium silicate, magnesium silicate, synthesized amorphous silica, colloidal silica, alumina, colloidal alumina, pseudoboehmite, aluminum hydroxide, lithopone, zeolite, magnesium hydroxide, etc.

These inorganic fine particles are preferably those having average primary particle diameter of not more than 30 nm, and more preferably not more than 16 nm in view of obtaining the advantage of the invention markedly. The lower limit of the particle diameter of the primary particles is about 40 nm in view of difficulty of preparation.

In the present invention, silica or pseudoboehmite is preferred so that specifically, the transparency of a layer is high and fine voids are formed. Particularly, silica synthesized by a gas phase method is most preferably employed.

As the fine silica particles synthesized by a gas phase method, for example, AEROSIL Series manufactured by Nihon Aerosil Co., Ltd. is commercially available.

These inorganic fine particles can be employed in the form of the primary particles, or in the form of secondary aggregated particles. The fine particles observed in the recording sheet are allowed to have restriction as claimed in the application.

The fine particles are those comprising the inorganic fine particles mentioned above, preferable having average diameter of not more than 200 nm. Herein, the average particle diameter of fine inorganic particles is obtained by measuring particle diameters of randomly selected 100 particles employing a microscope and calculating a simple average (a number average). The particle diameter as described herein is represented by the diameter of an assumed circle which has the same area as the projection area of each grain.

The recording sheet of the invention comprises at least said inorganic fine particles and water-soluble cationic polymer. In one embodiment, said inorganic fine particles are employed by forming a cationic composite particles with the cationic polymer represented by formula (1) as a preferable example.

The average particle diameter of said fine particles is preferably not more than 200 nm, and more preferably 160 nm in view of obtaining the advantage of the invention markedly. The lower limit of the average particle diameter is not limited from the view point of obtaining the advantage of the invention. Practically it is about not less than 20 nm when the fine particles are formed by employing the inorganic fine particles having the primary average diameter.

One example includes the ink-absorptive layer of the ink jet recording sheet comprises at least a hydrophilic binder, fine particles having specific particle diameter and a cation polymer represented by formula (1).

In one embodiment of the invention, the above-mentioned fine inorganic particles are employed upon forming cationic composite particles with a cationic polymer having an average molecular weight of no more than 100,000, represented by general formula (1).

These fine particles, namely composite particles, are prepared by mixing the cationic polymer and the inorganic fine particles. When an aqueous solution comprising a water-soluble polymer is mixed with a dispersion comprising fine inorganic particles with anionic surfaces, a coagulation is formed and the resultant mixture is dispersed so that coagula formed during that time are dispersed.

By carrying out this dispersion processing, is obtained a dispersion of fine inorganic particles which are subjected to cation conversion. Employed as dispersion processing methods can be a variety of conventional types of homogenizers known in the art such as a high speed rotation homogenizer, a media agitation-type homogenizer (a ball mill, a sand mill, etc.), an ultrasonic homogenizer, a colloid mill homogenizer, a roll mill homogenizer, a high pressure homogenizer, etc. However, in the present invention, the ultrasonic homogenizer or the high pressure homogenizer is preferably employed so that fine particles like as undissolved coagula are efficiently dispersed.

The ultrasonic homogenizer generally generates ultrasonic waves at 20 to 25 KHz so that energy is converged on the interface between solid and liquid to result in dispersion, and dispersion is carried out efficiently. I is suitable for preparing smaller amount of dispersion.

On the other hand, a pressure homogenizer is constructed in such a manner that at the exit of a high pressure pump, having 3 or 5 pistons, one or two homogeneous valves are provided in which the gap can be adjusted, employing a screw or oil pressure. Pressure is applied to a liquid medium conveyed by the high pressure pump while a flow is restricted employing the homogeneous valve, and when passing the homogeneous valve, fine undissolved coagula are pulverized.

This system can continually disperse a large amount of liquid, and is most preferably employed to prepare a large amount of dispersion. The pressure applied to the homogenous valve is generally between 50 and 1,000 $Kg/cm^2$, and the dispersion may be completed in one cycle or several repeated cycles.

The above-mentioned dispersions may be employed in combination of at least two types.

When preparing a cationic dispersion, it can be prepared upon adding a various types of additives.

For example, if desired, employed can be various types of nonionic or cationic surface active agents, anti-foaming agents, nonionic hydrophilic polymers (polyvinyl alcohol, polyvinylpyrrolidone, polyethylene oxide, polyacrylamide, various types of sugars, gelatin, Pullulan, etc.), nonionic or cationic latexes dispersion, water-miscible organic solvents (ethyl acetate, methanol, ethanol, isopropanol, n-propanol, acetone, etc.), inorganic salts, pH modulators, etc.

Specifically, water-miscible organic solvents are preferred due to minimizing the formation of fine undissolved coagula formed through mixing fine inorganic particles and a cationic polymer. Such a water-miscible organic solvent is employed preferably in an amount of 0.1 to 20 weight percent in the dispersion, and most preferably in an amount of 0.5 to 10 weight percent.

When the cationic dispersion is prepared, the pH may widely vary depending on types of fine inorganic particles, types of cationic polymers, various types of additives, etc. However, generally, the pH is between 1 and 8, and is most preferably between 2 and 7.

The cationic polymers employed in the present invention are represented by general formula (1).

In the general formula (1), R represents a hydrogen atom or an alkyl group having from 1 to 4 carbon atoms, and is preferably a hydrogen atom or a methyl group.

$R_1$, $R_2$, and $R_3$ each independently represents an alkyl group, and each is preferably a methyl group or an ethyl group. Each of these alkyl groups may have a substituent.

J represents a divalent bonding group, a simple bonding group or a divalent organic group, and preferably represents—CON(R') (R' represents a hydrogen atom or an alkyl group which may have a substituent) as the organic group.

$X^-$ represents an anion (a halogen ion, a methyl sulfate ion, a p-toluenesulfonate ion, etc.).

Q represents a repeated unit, derived from a monomer having an ethylenic unsaturated group.

Listed as specific examples of monomers represented by Q can be, for example, styrene, butadiene, methyl methacrylate, ethyl methacrylate, butyl methacrylate, ethyl acrylate, butyl acrylate, hydroxyethyl methacrylate, vinyl acetate, vinyl ether, acrylamide, N-methylacrylamide, N-vinylimidazole, 4-vinylpyridine, N-vinylpyrrolidone, vinyl chloride, etc.

Q includes the case in which at least two types of monomers are polymerized. x represents 40 to 100 mole percent and y represents 0 to 60 mole percent, preferably, x represents 50 to 100 mole percent and y represents 0 to 50 mole percent, and x is most preferably between 70 and 100 mole percent while y is most preferably between 0 and 30 mole percent.

Specific examples of cationic polymers represented by the general formula (1) are shown.

P-1

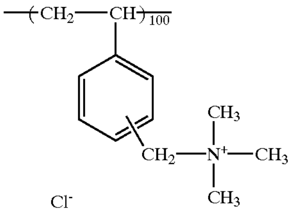

-continued

P-2

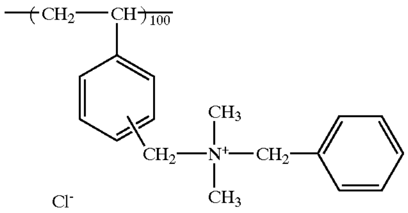

P-3

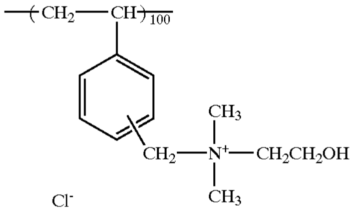

P-4

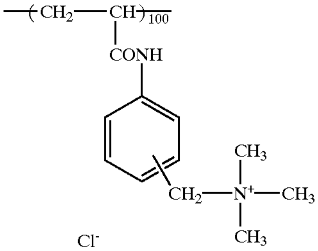

P-5

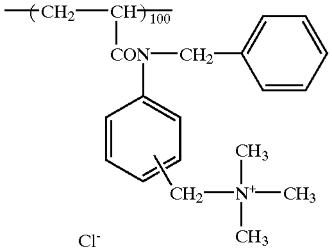

P-6

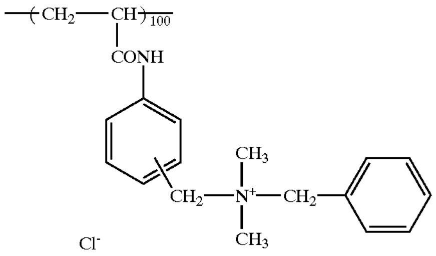

P-7

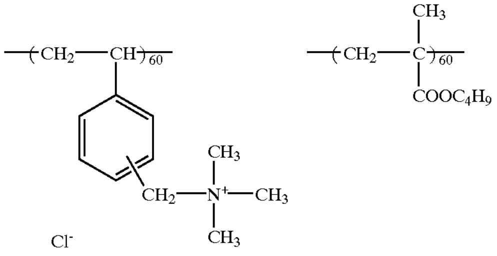

-continued
P-8
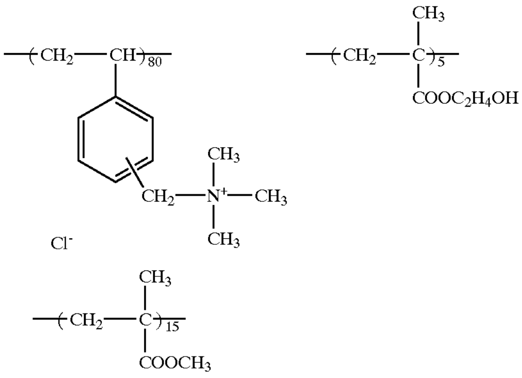
P-9
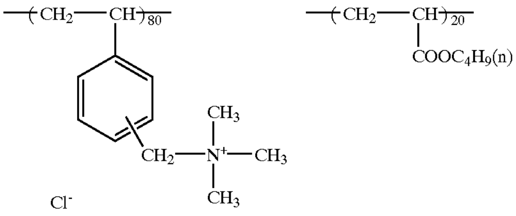
P-10
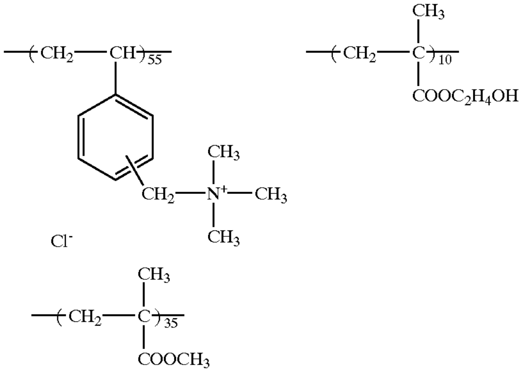
P-11
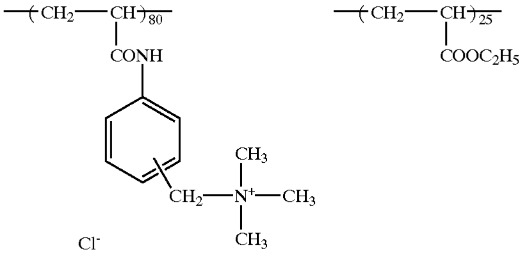
P-12
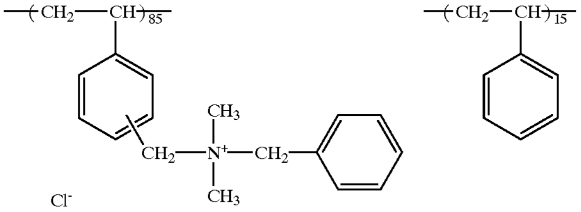
-continued
P-13
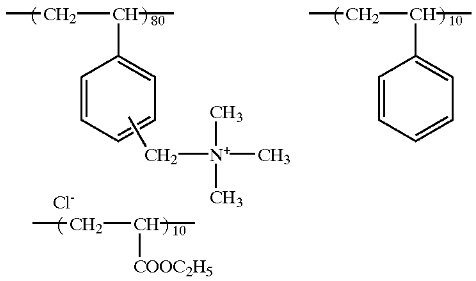
P-14
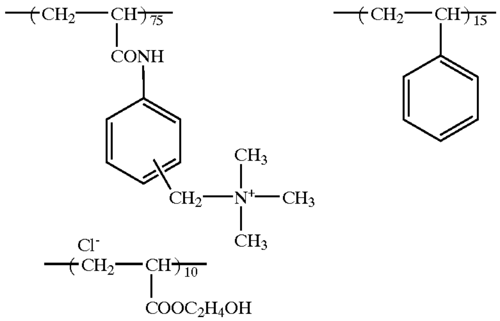
P-15
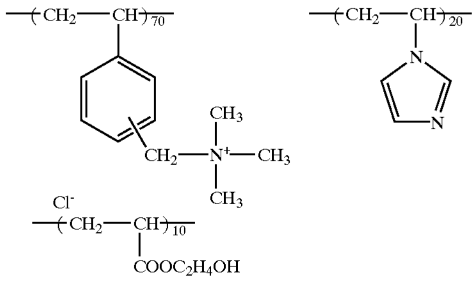
P-16
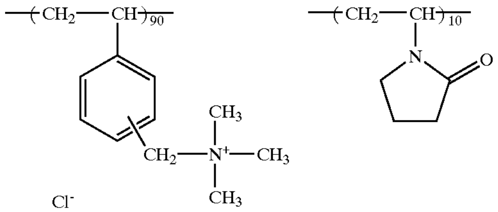
P-17
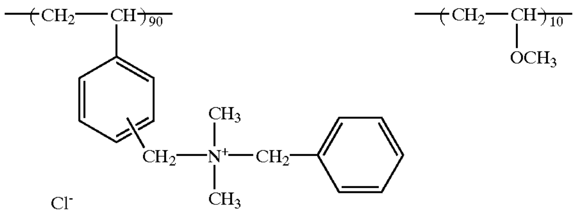
P-18
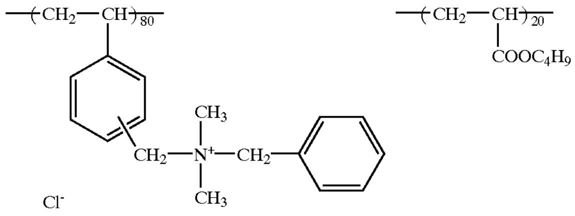

The average molecular weight, represented by number average molecular weight, of the cationic polymers represented by general formula (1) is required to be no more than 100,000.

The number average molecular weight as described herein is a value converted to styrene value obtained by gel permeation chromatography.

When the number average molecular weight is not more than 100,000, coagula are prevented upon adding an aqueous cationic polymer solution to dispersion containing fine anionic inorganic particles. Therefore, a uniform dispersion can be formed. When a fine composite particle dispersion composed of such a cationic polymer and fine inorganic particles are applied to an ink jet recording sheet, high gloss cannot be obtained. Accordingly, the number average molecular weight is preferably no more than 50,000.

The lower limit of the number average molecular weight is generally at least 2,000 in terms of water resistance of dyes, and is most preferably at least 5,000.

The ratio of the above-mentioned fine inorganic particles to the polymer varies depending on types of fine inorganic particles, diameters, or types of cationic polymers and average molecular weight, however, is generally between 1:0.01 and 1:1.

Various types of hydrophilic binders may be employed in the recording sheet of the present invention. The hydrophilic binders are preferred which result in neither coagulation nor remarkable viscosity increasing function when mixed with fine inorganic particles and cationic polymer. Listed as such hydrophilic binders can be, for example, gelatin (preferably acid-treated gelatin), polyvinylpyrrolidone (preferably having an average molecular weight of at least 200,000), Pululan, polyvinyl alcohol or derivatives thereof, polyethylene glycol (preferably having an average molecular weight of at least 100,000), hydroxyethyl cellulose, dextran, dextrin, water-soluble polyvinyl butyral. These hydrophilic binders may be employed individually, or in combination of at least two types.

Specifically preferred hydrophilic binders are polyvinyl alcohols or cation-modified polyvinyl alcohols.

The average polymerization degree of polyvinyl alcohol preferably employed in the present invention is preferably between 300 and 4,000, and specifically, those having an average molecular weight of at least 1,000 are preferred because the brittleness of the resultant layer is improved. Furthermore, the saponification ratio of polyvinyl alcohol is preferably between 70 and 100 percent, and is most preferably between 80 and 100 percent.

Furthermore, the cation-modified polyvinyl alcohol is obtained by saponifying a copolymer of ethylenic unsaturated monomers having a cationic group with vinyl acetate.

Listed as ethylenic unsaturated monomers having a cationic group are, for example, trimethyl-(2-acrylamide-2,2-dimethylethyl)ammonium chloride, trimethyl-(3-acrylamide-3,3-dimethylpropyl)ammonium chloride, N-vinylimidazole, N-vinyl-2-methylimidazole, N-(3-dimethylaminopropyl)methacrylamide, hydroxylethyltrimethylammonium chloride, trimethyl-(-methacrylamidopropyl)ammonium chloride, N-(1,1-dimethyl-3-dimethylaminopropyl)acrylamide, etc.

The ratio of monomers containing a cation-modified group of cation-modified polyvinyl alcohol is between 0.1 and 10 mole percent of vinyl acetate, and is preferably between 0.2 and 5 mole percent.

The polymerization degree of the cation-modified polyvinyl alcohol is generally between 500 and 4,000, and is preferably between 1,000 and 4,000.

Furthermore, the saponification ratio of the cation-modified polyvinyl alcohol is generally between 60 and 100 mole percent, and is preferably between 70 and 99 mole percent.

The above-mentioned hydrophilic binder is employed in a relatively small amount for fine inorganic particles so that the ink absorptive layer works as a void layer. The binder is preferred to be employed as minute as possible in the range in which the layer is stably formed, and the adhesion to the support is sufficiently secured. Generally, the employed amount is between ⅓ and ¹⁄₁₀ for the above-mentioned fine inorganic particles, and is specifically preferable between ¼ and ⅛.

In order to obtain high glossiness as well as a high void ratio without degrading the layer brittleness, the ink jet recording sheet of the present invention is preferably hardened by hardeners.

Generally speaking, such hardeners are compounds having a group which can react with the above-mentioned hydrophilic binder, or compounds which promote reactions between different groups, which are incorporated into the hydrophilic binder, and are suitably selected and employed in response to the types of binders.

Listed as specific examples of hardeners are, for example, epoxy series hardeners (diglycidyl ethyl ether, ethylene glycol diglycidyl ether, 1,4-butanediol diglycidyl ether, 1,6-diglycidylcyclohexane, N,N-diglycidyl-4-glycidyloxyaniline, sorbitol polyglycidyl ether, glycerol polyglycidyl ether, etc.), aldehyde series hardeners (formaldehyde, glyoxal, etc.), active halogen series compounds (2,4-dichloro-4-hydroxy-1,3,5-s-triazine, etc.), active vinyl series compounds (1,3,5-torisacryroyl-hexahydro-s-triazine, bisvinylsulfonyl methyl ether, etc.), boric acids and salts thereof, borax, aluminum alum, etc.

When polyvinyl alcohols and/or cation-modified polyvinyl alcohols are employed as specifically preferred hydrophilic binders, hardeners are preferably employed which are selected from boric acids and salts thereof, and epoxy series hardeners.

The most preferable hardeners are those selected from boric acids and salts thereof.

In the present invention, the boric acids and salts thereof show oxygen acids having a boron atom as the central atom, and include orthoboric acid, diboric acid, metaboric acid, tetraboric acid, pentaboric acid, and octaboric acid, and salts thereof.

The employed amount of the above-mentioned hardeners vary depending on types of hydrophilic binders, types of hardeners, types of fine inorganic particles, their ratio to hydrophilic binders, etc., however, it is generally between 5 and 500 mg per gram of the hydrophilic binder, and is preferably between 10 and 400 mg.

The above-mentioned hardeners may be added to a void layer-forming coating composition and/or coating compositions which form other layers adjacent to the void layer. Alternatively, hardeners may be provided to the void layer in such a manner that the above-mentioned void layer-forming coating composition is applied onto a support onto which a hardener-containing coating composition has been applied, and further after coating and drying a hardener-free void layer-forming coating composition, a hardener solution is applied thereon. However, in terms of production efficiency, hardeners are preferably added to a void layer-forming coating composition or a coating composition of a layer adjacent to the void layer so that hardeners are supplied at the same time when the void layer is formed.

To the ink absorptive layer of the ink jet recording sheet of the present invention and other layers which are provided as required, various types of additives other than those described above can be added.

Added can be, for example, polystyrene, polyacrylic acid esters, polymethacrylic acid esters, polyacrylamides, polyethylene, polypropylene, polyvinyl chloride, polyvinylidene chloride, or copolymers thereof, urea resin, or fine organic latex particles such as melamine resin, etc., liquid paraffin, dioctyl phthalate, tricresyl phosphate, fine oil droplets such as silicone oil, various types of cationic polymers, various types of cationic or nonionic surface active agents, UV absorbers described in Japanese Patent Publication Open to Public Inspection Nos. 57-74193, 57-87988, and 62-261476, anti-discoloring agents described in Japanese Patent Publication Open to Public Inspection Nos. 57-74192, 58-87989, 60-72785, 61-146591, 1-95091, and 3-13376, fluorescent whitening agents described in Japanese Patent Publication Open to Public Inspection Nos. 59-42993, 59-52689, 62-280069, 61-242871, and 4-219266, and various types of additives known in the art such as pH regulators, for example, sulfuric acid, phosphoric acid, citric acid, sodium hydroxide, potassium carbonate, etc., anti-foaming agents, antiseptics, thickeners, antistatic agents, matting agents, etc.

The void volume in the ink absorptive layer of the ink jet recording sheet of the present invention is between about 20 and about 40 ml/M$^2$, and further, the void ratio in this layer is between about 0.5 and about 0.8.

The above-mentioned ink absorptive layers may be composed of at least two layers. In such a case, the compositions of these ink absorptive layers may be the same or different.

When the ink absorptive layers are composed of at least two layers, the cationic polymer represented by general formula (1) may be added to all the ink absorptive layers or some of them, however, it is preferably added to the ink absorptive layer furthest from the support.

Furthermore, polymers other than cationic polymers represented by general formula (1) can be added in combination to each ink absorptive layer.

The polymers other than cationic polymers represented by general formula (1) can be selected optionally from cationic polymers known employed in the ink jet recording sheets, and the particularly preferable one is that having number molecular weight of 1,000 to 100,000.

Particularly, in case that a cationic polymer having tertiary ammonium base is a copolymer, the ratio of cationic monomer is not less than 10 mol %, preferably 20 mol %, particularly preferably not less than 30 mol %.

The cationic polymer having tertiary ammonium base can be employed singly or two or more.

Concrete examples of the cationic polymer are listed, which does not limit the embodiment of the invention.

P'-1

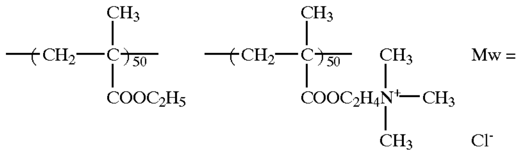

Mw = 20,000

P'-2

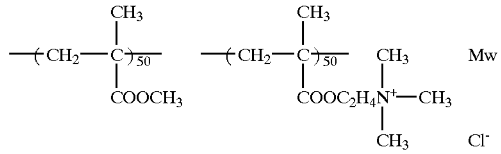

Mw = 25,000

P'-3

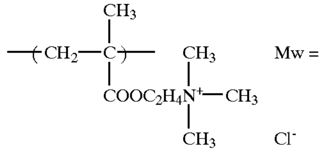

Mw = 50,000

P'-4

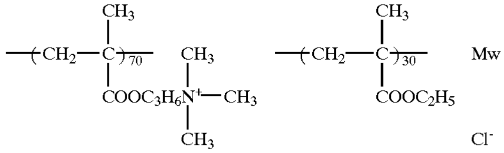

Mw = 63,000

P'-5

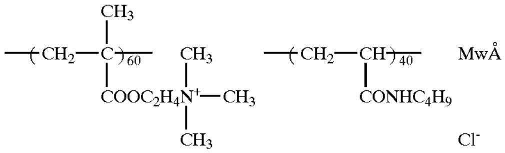

MwÅ = 19,000

P'-6

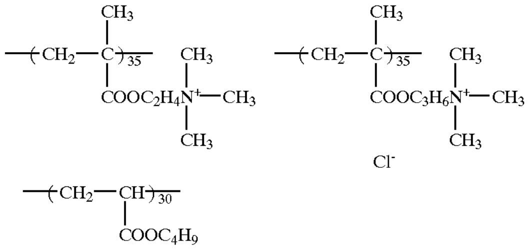

Mw = 72,000

P'-7

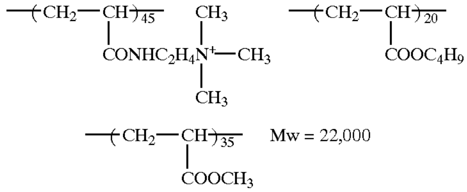

Mw = 22,000

-continued

P'-8

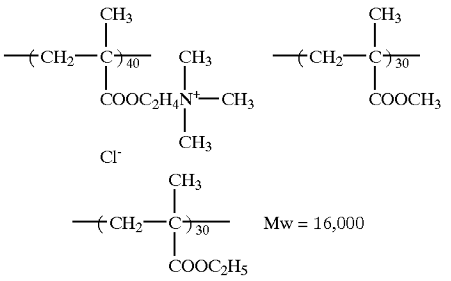

Mw = 16,000

P'-9

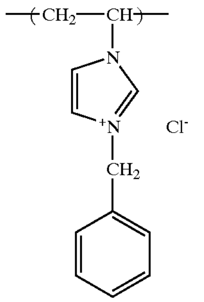

Mw = 71,000

The pH of the ink absorptive layer surface of the recording sheet of the present invention is required to be in the range of 3 to 6.5. When the pH of the layer surface is less than 3, effects to improve blur after printing are not obtained even employing the cationic polymer represented by general formula (1) and further, an ink absorptive volume decreases as the void ratio decreases. Furthermore, when the pH of the layer surface exceeds 6.5, the blur after printing is not reduced and the gloss tends to decrease.

The particularly preferred layer surface pH is in the range of 3.6 to 5.3.

The layer surface pH of the ink absorptive layer can be readily measured by dripping deionized water of 20 to 50 $\mu$l on the surface of a recording sheet and employing a commercially available pH electrode.

Suitably employed as the supports of the ink jet recording sheets of the present invention can be conventional paper supports, plastic supports, composite supports, and the like known in the art. However, in order to obtain clear images with increased density, hydrophobic supports are preferred into which ink liquid does not penetrate.

Preferably employed as hydrophobic supports are transparent or opaque plastic resin film supports, paper supports prepared by laminating the surfaces of paper with polyethylene, and the like.

The transparent supports include, films composed of materials such as, for example, polyester series resins, diacetate series resins, triacetate series resins, acrylic series resins, polycarbonate series resins, polyvinyl chloride series resins, polyimide series resins, cellophane, celluloid, and the like. Of them, those are preferred, which are durable for heat radiation when used for OHP, and polyethylene terephthalate is particularly preferred. The thickness of such transparent supports is preferably between about 10 and about 200 $\mu$m. It is preferred to provide sublayers on the ink receptive layer side and the backing layer side from the viewpoint of adhesion of the ink receptive layer and backing layer to the support.

Furthermore, preferably employed as supports which are used when transparency is not required are resin coated paper (so-called RC paper) having polyolefin resin coated layer comprising white pigments, etc. on at least one surface of a paper support, and so-called white PET prepared by adding white pigments to polyethylene terephthalate.

With the purpose of enhancing adhesion strength between the above-mentioned support and the ink receptive layer, the support is preferably subjected to corona discharge treatment and subbing treatment prior to coating the ink receptive layer. Further, the recording sheet of the present invention is not always required to be colorless and may be a colored recording sheet.

As the ink jet recording sheet of the present invention, a paper support which is laminated with polyethylene on both surfaces is particularly preferred because recorded images approach photographic qualities and are obtained at relatively low cost. Such a polyethylene laminated paper support is described below.

Paper employed for a paper support is produced employing wood pulp as a main raw material, and in addition, synthetic pulp such as polypropylene, etc. or synthetic fiber such as nylon, polyester, and the like, if required. As the wood pulp, any of LBKP, LBSP, NBKP, NBSP, LDP, NDP, LUKP, and NUKP can be employed. However, LBKP, NBSP, LBSP, NDP, and LDP having a shorter fiber portion are preferably employed in a larger ratio. However, a content ratio of LBSP and/or LDP is preferably between 10 and 70 weight percent.

As the above-mentioned pulp, chemical pulp (sulfate pulp or sulfite pulp) containing minimum impurities is preferably employed, and pulp which is subjected to bleaching treatment to increase whiteness is also beneficial.

Into the paper, can appropriately be added higher fatty acids, sizing agents such as alkylketene dimer, etc., white pigments such as calcium carbonate, talc, titanium oxide, etc., paper strengthening agents such as starch, polyacrylamide, polyvinyl alcohol, etc., fluorescent whitening agents, moisture maintaining agents such as polyethylene glycol, etc., dispersing agents, softening agents such as quaternary ammonium, etc.

The degree of water freeness of pulp employed for paper-making is preferably between 200 and 500 ml according to CSF specification. Furthermore, the sum of weight percent of 24-mesh residue and weight percent of 42-mesh calculated portion regarding the fiber length after beating, specified in JIS-P-8207 is preferably between 30 and 70 percent. Further, the weight percent of 4-mesh residue is preferably no more than 20 weight percent.

The weight of the paper is preferably between 30 and 250 g/$m^2$, and is most preferably between 50 and 200 g/$m^2$. The thickness of the paper is preferably between 40 and 250 $\mu$m.

The paper may be calendered, during or after paper-making process, to result in enhanced smoothness. The density of the paper is generally between 0.7 and 1.2 g/$m^2$ (JIS-P-8118). Furthermore, the rigidity of the base paper is preferably between 20 and 200 g under conditions specified in JIS-P-8143.

A surface sizing agent may be coated onto the surface of the paper. As surface sizing agents, the same as those described above which can be incorporated into the paper can be employed.

The pH of the paper, when measured employing a hot water extraction method specified in JIS-P-8113, is preferably between 5 and 9.

As polyethylene which covers both surfaces of the paper, low density polyethylene (LDPE) and/or high density polyethylene (HDPE) is mainly employed. However, other than these, LLDPE, polypropylene, and the like can be partially employed.

Specifically, a polyethylene layer on the surface of an ink receptive layer is preferably one in which, as carried out in photographic paper, rutile- or anatase-type titanium oxide is incorporated into polyethylene, and opacity as well as whiteness are improved. The content of titanium oxide is generally between 3 and 20 percent by weight of polyethylene, and is preferably between 4 and 13 percent by weight.

Polyethylene coated paper can be employed as glossy paper. Furthermore, in the present invention, polyethylene coated paper having a matte or silk surface can also be employed, which is prepared by embossing when polyethylene is melt-extrude-coated onto the surface of the paper.

The employed amount of polyethylene on both surfaces of the paper is determined so that after providing an ink receptive layer and a backing layer, tendency to curl is minimized under low and high humidity. Generally, the thickness of the polyethylene layer on the ink receptive layer side is in the range of 20 to 40 μm and that of the backing layer side is in the range of 10 to 30 μm.

Further, the above-mentioned polyethylene coated paper support having the following characteristics is preferably employed:

1. Tensile strength: being strength specified in JIS-P-8113, 2 to 30 kg in the longitudinal direction, and 1 to 20 kg in the lateral direction
2. Tear strength: to be 10 to 200 g in the longitudinal direction and 20 to 200 g in the lateral direction in accordance with the method specified in JIS-P-8116
3. Compression elastic modulus: 103 $kgf/cm^2$ or more
4. Beck surface smoothness: preferably no less than 20-second light for a gloss surface under conditions specified in JIS-P-8119, and for embossed paper support, acceptable for less than this value
5. Opacity: transmittance of visible light is preferably no more than 20% and most preferably no more than 15% under measurement conditions of parallel light incidence/diffused light transmission.

With the recording sheet of the present invention, various types of hydrophilic layers such as a void layer, a sublayer, etc., which are optionally employed, if required, are coated onto a support employing a method suitably selected from those known in the art. A preferred method is such that a coating composition composing each layer is coated and dried. In this case, at least two layers can be simultaneously coated. Specifically, simultaneous coating is preferred, which coats all hydrophilic binder layers simultaneously.

Employed as the coating methods are preferably a roll coating method, a rod bar coating method, an air knife coating method, a spray coating method, a curtain coating method, or an extrusion coating method employing a hopper, as described in U.S. Pat. No. 2,681,294.

When images are recorded employing the ink jet recording sheet of the present invention, a recording method using water-based ink is preferably employed.

The water-based ink comprises liquid media composed of primarily colorant and water, and other additives. Employed as colorants can be water-soluble dyes and water-dispersed pigments, known in the art regarding ink jet printing such as direct dyes, acid dyes, basic dyes, reactive dyes, or food dyes, etc.

Listed as solvents of water-based inks are water and various water-soluble organic solvents, for example, alcohols such as methyl alcohol, isopropyl alcohol, n-butyl alcohol, tert-butyl alcohol, isobutyl alcohol, etc.; amides such as dimethylformamide, dimethylacetamide, etc.; ketones or ketone alcohols such as acetone, diacetone alcohol, etc.; ethers such as tetrahydrofran, dioxane, etc.; polyalkylene glycols such as polyethylene glycol, polypropylene glycol, etc.; polyhydric alcohols such as ethylene glycol, propylene glycol, butylene glycol, triethylene glycol, 1,2,6-hexanetriol, thioglycol, hexylene glycol, diethylene glycol, glycerin, triethanolamine, etc.; lower alkyl ethers of polyhydric alcohols such as ethylene glycol methyl ether, diethylene glycol methyl (or ethyl) ether, triethylene glycol monobutyl ether, etc.; and the like.

Of a number of these water-soluble organic solvents, polyhydric alcohols such as diethylene glycol, triethanolamine, glycerin, etc., and lower alkyl ethers of polyhydric alcohols such as triethylene glycol monobutyl ether, etc., are preferred.

Other additives for the water-based inks include, for example, pH regulators, sequestering agents, mildewcides, viscosity modifiers, surface tension adjusting agents, wetting agents, surface active agents, rust preventives, etc.

In order to improve wettability onto a recording sheet, the water-based ink solution generally has, at 20° C., a surface tension in the range of 25 to 60 dyn/cm, and preferably in the range of 30 to 50 dyn/cm.

EXAMPLES

The present invention is explained with reference to examples below, however, the present invention is not limited to these examples. Further, "%" in examples represents the absolute dry weight percent, unless otherwise specified.

Example 1

While stirring at room temperature, 4,500 ml of 18 percent aqueous dispersion Al (having a pH of 2.5 and containing 3 weight percent of ethanol), in which gas phase method silica (AEROSIL 300, manufactured by Nihon Aerosil Kogyo Co.) with an average primary particle diameter of approximately 0.007 μm had been previously and uniformly dispersed, were added to 1,000 ml of an aqueous solution C1 (having a pH of 2.5 and containing 2 g of antifoaming agent SN381, manufactured by Sannobuko Co.) containing 12 weight percent of exemplified cationic polymer P-1 (having an average molecular weight of about 25000), 3 weight percent of n-propanol, and 2 weight percent of ethanol.

Next, 350 ml of aqueous mixed solution containing boric acid and borax of 1:1 (having a concentration of 5 percent of boric acid and borax, respectively) were gradually added while stirring.

Next, the resulting mixture was subjected to dispersion at a pressure of 500 $Kg/cm^2$ employing a high pressure homogenizer manufactured by Sanwa Kogyo Co. and nearly transparent Dispersion B1 was obtained.

Next, employing the above-mentioned dispersion B1, 4 types of coating compositions described below were prepared.

First Layer Coating Composition (showing the amounts per liter of the coating composition)

| | |
|---|---|
| Silica Dispersion B1 | 650 ml |
| Fluorescent whitening agent dispersion (described below) | 20 ml |
| Titanium oxide dispersion (described below) | 25 ml |
| Polyvinyl alcohol (PVA203, manufactured by Kuraray Co.) 10% aqueous solution | 5 ml |
| Polyvinyl alcohol (PVA235, manufactured | 270 ml |

-continued

| | |
|---|---|
| by Kuraray Co.) 5% aqueous solution | |
| Latex dispersion (AE803, manufactured Showa Kobunshi Kogyo Co.) | 20 ml |
| Deionized water to make | 1,000 ml |
| Second Layer Coating Composition (showing the amounts per liter of the coating composition) | |
| Silica dispersion B1 | 650 ml |
| Fluorescent whitening agent dispersion (described below) | 30 ml |
| Polyvinyl alcohol (PVA203, manufactured by Kuraray Co.) 10% aqueous solution | 5 ml |
| Polyvinyl alcohol (PVA235, manufactured by Kuraray Co.) 5% aqueous solution | 270 ml |
| Latex dispersion (AE803, manufactured by Showa Kobunshi Kogyo Co.) | 20 ml |
| Deionized water to make | 1,000 ml |
| Third Layer Coating Composition (showing the amounts per liter of the coating composition) | |
| Silica dispersion B1 | 620 ml |
| Fluorescent whitening agent dispersion (described below) | 20 ml |
| Polyvinyl alcohol (PVA203, manufactured by Kuraray Co.) 10% aqueous solution | 5 ml |
| Polyvinyl alcohol (PVA235, manufactured by Kuraray Co.) 5% aqueous solution | 270 ml |
| Latex dispersion (AE803, manufactured by Showa Kobunshi Kogyo Co.) | 10 ml |
| Deionized water to make | 1,000 ml |
| Fourth Layer Coating Composition (showing the amounts per liter of the coating composition) | |
| Silica dispersion B1 | 600 ml |
| Polyvinyl alcohol (PVA203, manufactured by Kuraray Co.) 10% aqueous solution | 5 ml |
| Polyvinyl alcohol (PVA235, manufactured by Kuraray Co.) 5% aqueous solution | 270 ml |
| Surface active agent (saponin) 10% aqueous solution | 10 ml |
| Silicone dispersion (BT-22-839, manufactured by Toray-Dow Corning-Silicone Co.) | 20 ml |
| Deionized water to make | 1,000 ml |

Fluorescent whitening agent dispersion: while heating, added to 100 ml of a 3% aqueous acid-treated gelatin solution (containing 4 g of saponin and 2 g of cationic polymer P-9) were a solution prepared by dissolving 0.6 g of an oil-soluble fluorescent whitening agent (UVITEX-OB manufactured by Ciba-Geigy Co. and 12 g of diisodecyl phthalate in 25 ml of ethyl acetate, and the resultant mixture was emulsify-dispersed employing an ultrasonic homogenizer. The total volume was then adjusted to 140 ml by adding deionized water.

Titanium oxide dispersion: dispersion comprising 40 weight percent of titanium oxide (W10), manufactured by Ishihara Sangyo Co.

The viscosity of each of the above-mentioned coating compositions was between 30 and 40 cp at 40° C., and was between 10,000 and 20,000 cp at 15° C.

Coating compositions prepared as described above were applied onto the recording side surface (having a 75° glossiness of 32 percent of the support, onto which a sublayer with gelatin of 0.1 g/$m^2$ had been applied) of a 170 g/$m^2$ paper support (having a thickness of 240 $\mu$m) laminated with polyethylene on both surfaces (having a thickness of about 35 $\mu$m and comprising 6 weight percent of anatase-type titanium dioxide in the polyethylene layer on the recording surface and having an about 30 $\mu$m thick polyethylene layer on the reverse surface) in the order of the first layer (50 $\mu$m), the second layer (50 $\mu$m), the third layer (50 $\mu$m), and the fourth layer (50 $\mu$m). The value in parenthesis shows each wet layer thickness. The first layer through the fourth layer were coated simultaneously.

Each coating composition was coated at 40° C. employing a four-layer type slide hopper, and cooled immediately after coating for 20 seconds in a cooling zone maintained at 0° C. The coating was then dried successively employing blown air at 20 to 30° C. for 60 seconds, blown air at 45° C. for 60 seconds, and blown air at 50° C. for 60 seconds, and Recording Sheet-1 of the present invention was thus obtained.

Subsequently, the resultant recording sheet was stored at 35° C. for two days.

Next, dispersions B2 through B10 were prepared in the same manner as dispersion B1, except that in Recording Sheet-1, cationic polymers were replaced as shown in Table 1, and Recording Sheet-2 through Recording Sheet-10 were prepared in the same manner as Recording Sheet-1.

Prepared ink jet recording sheets were evaluated on the items described below.

(1) Surface pH: 30 $\mu$l of deionized water was dripped on an ink absorptive layer and the layer surface pH was recorded at room temperature employing a flat electrode (GST-5313F), manufactured by Toa Denpa Co.

(2) Glossiness: 75° glossiness was recorded employing a variable angle glossmeter (VGS-1001D P), manufactured by Nippon Denshoku Kogyo Co.

(3) Image blur: lines having a width of about 0.3 mm of M, C, and K were printed employing PM750C manufactured by Seiko-Epson Co., and were stored at 23° C. for a week. The density of each printed line was measured in the direction of the width employing a microdensitometer, and a line broadening ratio (the ratio of the line width after storage to that of the original) was obtained.

Table 1 shows the obtained results.

TABLE 1

| Recording Sheet | Cationic Polymer (average molecular weight) | Layer Surface pH | Glossiness | Image Blur M | C | K |
|---|---|---|---|---|---|---|
| 1 | P-1 (35,000) | 4.52 | 59% | 1.12 | 1.04 | 1.26 |
| 2 | P-4 (32,000) | 4.47 | 57% | 1.09 | 1.02 | 1.21 |
| 3 | P-7 (19,000) | 4.39 | 56% | 1.18 | 1.06 | 1.37 |
| 4 | P-12 (28,000) | 4.67 | 58% | 1.07 | 1.02 | 1.20 |
| 5 | P-1 (12,000) | 4.52 | 56% | 1.16 | 1.05 | 1.26 |
| 6 | P-1 (68,000) | 4.59 | 52% | 1.09 | 1.02 | 1.21 |
| 7 | P-1 (110,000) | 4.60 | 47% | 1.08 | 1.02 | 1.20 |
| 8 | Comparative RP1 (22,000) | 4.39 | 57% | 1.31 | 1.29 | 1.52 |
| 9 | Comparative RP2 (37, 000) | 4.55 | 58% | 1.39 | 1.18 | 1.82 |
| 10 | not added | 4.61 | 57% | >3.0 | 2.9 | >3.0 |
| 11 | P-18 (30,000) | 4.42 | 57% | 1.09 | 1.02 | 1.22 |

The number average molecular weight of cation polymer is a value converted to styrene value obtained by gel permeation chromatography.

Fine particles contained in the ink-absorptive layer of recording sheet 1 was observed as 60 nm in diameter by electronmicroscopy.

Comparative RP1

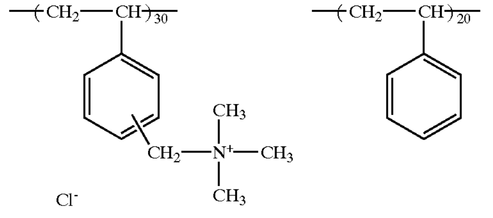

-continued

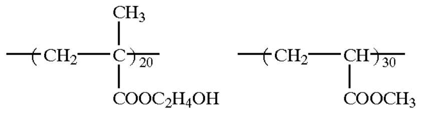

Comparative RP2

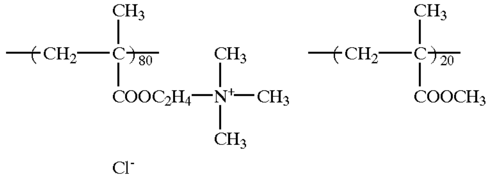

Based on the results in Table 1, it is found that any of Recording Sheets-1 through -11 (particularly 1 to 7) exhibit high glossiness and further, result in reduced blur after printing. Specifically, it is found that Recording Sheets-1 through -5, in which polymers, having a molecular weight of no more than 50,000 are employed as the cationic polymers, exhibit high glossiness, and Recording Sheet-1, -2 and -4 through -6, having a cationic monomer component ratio of at least 70 percent, result in reduced blur.

Contrary to this, it is found that Recording Sheet-7, in which a cationic polymer having an average molecular weight of no less than 100,000 is employed, results in decrease in gloss, and Recording Sheet-8, in which Comparative Cationic Polymer RP1 having a cationic monomer ratio of 30 percent is employed, and Recording Sheet-9 in which a cationic polymer prepared by polymerizing cationic monomers not represented by general formula (1) is employed, result in more increased blur than the recording sheets of the present invention.

Example 2

Dispersions B1(a) through B1(f) were prepared in the same manner as dispersion B1, except that in the preparation of dispersion B1 employed in Recording Sheet-1 of Example 1, the pH of each of solutions A1 and C1 was varied, and Recording Sheets-l(a) through -(f) were prepared in the same manner as Recording Sheet-1.

Evaluation was carried out in the same manner as Example 1, and the results shown in Table 2 were obtained. Furthermore, the rate of ink absorption was measured employing a Bristow test apparatus manufactured by Kumagai Riki Kogyo Co., and the transferred amount of ink during a 2-second contact time was obtained as an ink absorption volume. Table 2 shows the results.

TABLE 2

| Recording Sheet | Layer Surface pH | Glossiness | Image Blur M | Image Blur C | Image Blur K | Ink Absorption Volume ($ml/m^2$) |
|---|---|---|---|---|---|---|
| 1 | 4.52 | 59 | 1.12 | 1.04 | 1.26 | 25.3 |
| 1 (a) | 2.88 | 60 | 1.51 | 1.32 | 1.72 | 21.2 |
| 1 (b) | 3.43 | 58 | 1.29 | 1.15 | 1.32 | 23.9 |
| 1 (c) | 3.98 | 59 | 1.17 | 1.09 | 1.26 | 24.5 |
| 1 (d) | 5.11 | 57 | 1.13 | 1.02 | 1.22 | 25.2 |
| 1 (e) | 5.52 | 53 | 1.27 | 1.12 | 1.36 | 25.0 |
| 1 (f) | 6.25 | 49 | 1.30 | 1.31 | 1.28 | 24.5 |
| 1 (g) | 6.80 | 41 | 1.39 | 1.35 | 1.78 | 24.0 |

Based on the results shown in Table 2, it is found that Recording Sheets-1, -1(b) through -1(e) having a layer surface pH of 3 to 6 result in reduced blur, and when recording sheets have a pH other than these, effects for minimizing blur is small. It is also found that specifically, Recording Sheets-1, -A1(c), and -1(d), having a layer surface pH of 3.6 to 5.3, result in reduced blur and further, result in minimum decrease in absorption volume and gloss.

Example 3

Dispersions B12 through B17 were prepared in the same manner as dispersion B1, except that in the preparation of dispersion B1 employed in Recording Sheet-1 of Example 1, modification was made as mentioned below, and Recording Sheets-12 through -17 were prepared in the same manner as Recording Sheet-1.

Dispersion 12: Amount of the cationic polymer was reduced to ⅔ in Dispersion B1.

Dispersion 13: Silica particles in Dispersion B1 was replaced by gas phase method silica having primary average particle diameter of 0.012 $\mu$m (AEROSIL 200, manufactured by Nihon Aerosil Kogyo Co.).

Dispersion 14: Silica particles in Dispersion B1 was replaced by gas phase method silica having primary average particle diameter of 0.04 $\mu$m (OX50, manufactured by Nihon Aerosil Kogyo Co.).

Dispersion 15: Silica particles in Dispersion B1 was replaced by a 1:1 mixture by weight of gas phase method silica having primary average particle diameter of 0.007 $\mu$m employed in B1 and gas phase method silica having primary average particle diameter of 0.012 $\mu$m employed in B13.

Dispersion 16: Silica particles in Dispersion B1 was replaced by a 4:1 mixture by weight of gas phase method silica having primary average particle diameter of 0.007 $\mu$m employed in B1 and gas phase method silica having primary average particle diameter of 0.04 $\mu$m employed in B14.

Dispersion 17: Silica particles in Dispersion B1 was replaced by a 1:1 mixture by weight of gas phase method silica having primary average particle diameter of 0.07 $\mu$m employed in B1 and gas phase method silica having primary average particle diameter of 0.04 $\mu$m employed in B14.

Particle diameter contained in the ink-absorptive lawyer in each recording sheet was measured by electron microscope, and the result was shown in Table 3. For each recording sheet 12 to 7 pH at the surface was 4.52±0.1, same as that of ng sheet 1.

TABLE 3

| Recording sheet | Fine particles Dispersion | Average particle diameter | Gloss | Image Blur M | Image Blur C | Image Blur K |
|---|---|---|---|---|---|---|
| 1 | B1 | 60 nm | 59% | 1.12 | 1.04 | 1.26 |
| 12 | B12 | 76 nm | 57% | 1.10 | 1.02 | 1.21 |
| 13 | B13 | 90 nm | 56% | 1.12 | 1.03 | 1.22 |
| 14 | B14 | 230 nm | 25% | 1.09 | 1.02 | 1.20 |
| 15 | B15 | 110 nm | 52% | 1.12 | 1.04 | 1.21 |
| 16 | B16 | 100 nm | 54% | 1.15 | 1.05 | 1.28 |
| 17 | B17 | 180 nm | 39% | 1.10 | 1.03 | 1.28 |

The recording sheets-1, -12, -13, -15 through -17 demonstrate good result in gloss and image blur as shown in table 3, particularly, samples having particle diameter not more than 160 nm are excellent in gloss.

Example 4

Dispersions B1 in Recording Sheet-1 of Example 1, was prepared in the same manner as dispersion B1, except that cation polymer P-1 (average molecular weight: about 25,000) 12 wt %, was replaced by a cation polymer described below in 12 wt %, corresponding to a cationic polymer other than the water-soluble cationic polymer (a) appeared in claim 4.

Recording sheet 1' was prepared by the same way as the Recording sheet 1, except that 650 ml of silica dispersion B1' was employed in place of 650 ml of silica dispersion B1 in the preparation of the First and Second Layer Coating Compositions. The surface pH of the Recording sheet 1' was 4.62.

As a result of evaluation the Recording sheet 1' possesses the advantage of the invention.

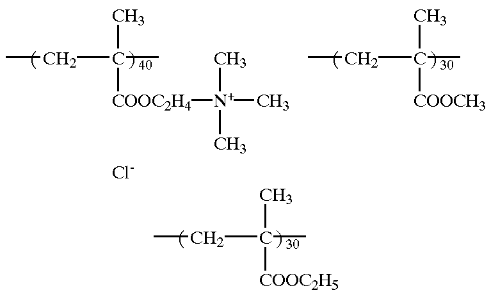

Industrial application

An ink jet recording sheet can be obtained, which is improved in image blur after they are stored at high temperature or stored in piles.

What is claimed is:

1. An ink jet recording sheet comprising a support having thereon an ink-absorptive layer comprising a hydrophilic binder, inorganic particles having an average particle diameter of no more than 200 nm and a water-soluble cationic polymer represented by formula (1) described below, wherein pH of a surface of the ink-absorptive layer is 3 to 6.5, Formula (1)

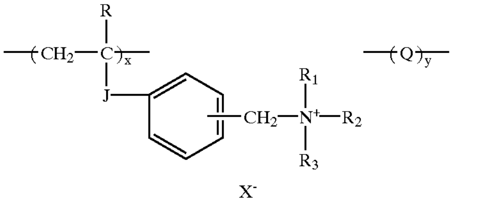

wherein R represents a hydrogen atom or an alkyl group having 1 to 4 carbon atoms, $R_1$, $R_2$, and $R_3$ each independently represents an alkyl group, and J represents a divalent bonding group; $X^-$ represents an anion; Q represents a repeat unit, derived from a monomer having an ethylenic unsaturated group, Q includes the case in which at least two types of monomers are polymerized; x represents 40 to 100 mole percent and y represents 0 to 60 mole percent.

2. An ink jet recording sheet comprising a support having thereon an ink-absorptive layer comprising a hydrophilic binder, particles having an average particle diameter of no more than 200 nm which are formed by composing inorganic particles having an average primary particle diameter of no more than 30 nm, and a water-soluble cationic polymer represented by formula (1) described below, wherein pH of a surface of the ink-absorptive layer is 3 to 6.5, Formula (1)

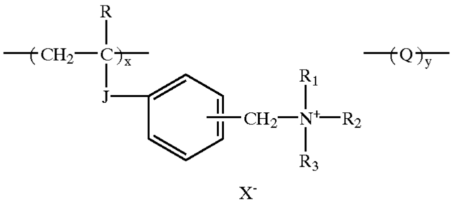

wherein R represents a hydrogen atom or an alkyl group having 1 to 4 carbon atoms, $R_1$, $R_2$, and $R_3$ each independently represents an alkyl group, and J represents a divalent bonding group; $X^-$ represents an anion; Q represents a repeat unit, derived from a monomer having an ethylenic unsaturated group; Q includes the case in which at least two types of monomers are polymerized; x represents 40 to 100 mole percent and y represents 0 to 60 mole percent.

3. An ink jet recording sheet comprising a support having thereon an ink-absorptive layer comprising a hydrophilic binder, particles having an average particle diameter of no more than 200 nm which are formed by composing inorganic particles having an average primary particle diameter of no more than 30 nm, and a water-soluble cationic polymer represented by formula (1) described below, having an average molecular weight of no more than 100,000, wherein pH of a surface of the ink-absorptive layer is 3 to 6, Formula (1)

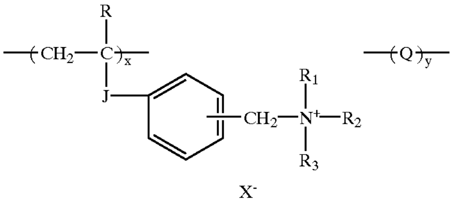

wherein R represents a hydrogen atom or an alkyl group having 1 to 4 carbon atoms, $R_1$, $R_2$, and $R_3$ each independently represents an alkyl group, and J represents a divalent bonding group, $X^-$ represents an anion, Q represents a repeat unit, derived from a monomer having an ethylenic unsaturated group, Q includes the case in which at least two types of monomers are polymerized, x represents 50 to 100 mole percent and y represents 0 to 50 mole percent.

4. An ink jet recording sheet comprising a support having thereon an ink-absorptive layer comprising a hydrophilic binder, inorganic particles having an average primary particle diameter of no more than 30 nm, and a water-soluble cationic polymer represented by formula (1) described below, wherein pH of a surface of the ink-absorptive layer is 3 to 6.5.

Formula (1)

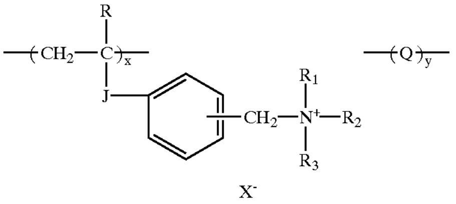

wherein R represents a hydrogen atom or an alkyl group having 1 to 4 carbon atoms, $R_1$, $R_2$, and $R_3$ each independently represents an alkyl group, and J represents a divalent bonding group; $X^-$ represents an anion; Q represents a repeat unit, derived from a monomer having an ethylenic unsaturated group; Q includes the case in which at least two types of monomers are polymerized; x represents 40 to 100 mole percent and y represents 0 to 60 mole percent.

5. An ink jet recording sheet comprising a support having thereon an ink-absorptive layer comprising a hydrophilic binder, inorganic particles having an average primary particle diameter of no more than 30 nm, and a water-soluble cationic polymer represented by formula (1) described below, having an average molecular weight of no more than 100,000, wherein pH of a surface of the ink-absorptive layer is 3 to 6, Formula (1)

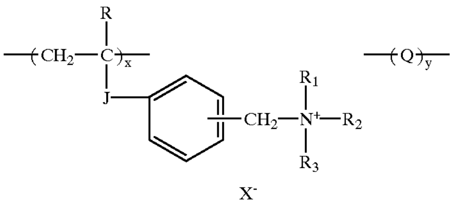

wherein R represents a hydrogen atom or an alkyl group having 1 to 4 carbon atoms, $R_1$, $R_2$, and $R_3$ each independently represents an alkyl group, and J represents a divalent bonding group; $X^-$ represents an anion; Q represents a repeat unit, derived from a monomer having an ethylenic unsaturated group; Q includes the case in which at least two types of monomers are polymerized; x represents 50 to 100 mole percent and y represents 0 to 50 mole percent.

6. An ink jet recording sheet comprising a support having thereon an ink-absorptive layer comprising a hydrophilic binder, inorganic particles having an average particle diameter of no more than 200 nm and a water-soluble cationic polymer represented by formula (1) described below, and a cationic polymer other than the water-soluble cationic polymer represented by formula (1) described below, wherein pH of a surface of the ink-absorptive layer is 3 to 6.5, Formula (1)

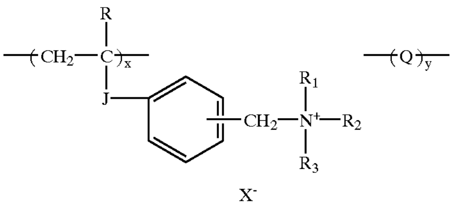

wherein R represents a hydrogen atom or an alkyl group having 1 to 4 carbon atoms, $R_1$, $R_2$, and $R_3$ each independently represents an alkyl group, and J represents a divalent bonding group; $X^-$ represents an anion; Q represents a repeat unit, derived from a monomer having an ethylenic unsaturated group; Q includes the case in which at least two types of monomers are polymerized; x represents 40 to 100 mole percent and y represents 0 to 60 mole percent.

7. The ink jet recording sheet of claim 1, wherein the inorganic particles are silica synthesized by gas phase method.

8. The ink jet recording sheet of claim 1, wherein the inorganic particles have an average particle diameter of 20 to 160 nm.

9. The ink jet recording sheet of clam 1, wherein the J represents —CON(R')—, in which R' represents a hydrogen atom or n alkyl group which is optionally subsituted.

10. The ink jet recording sheet of claim 1, wherein the ratio of the inorganic particles to the water-soluble cationic polymer is between 1:0.01 and 1:1.

11. The ink jet recording sheet of claim 8, wherein the J represents —CON(R')—, in which R' represents a hydrogen atom or an alkyl group which is optionally substituted, and the ratio of the inorganic particles to the water-soluble cationic polymer is between 1:0.01 and 1:1.

12. The ink jet recording sheet of claim 1 wherein the hydrophilic binder is polyvinyl alcohol or cation-modified polyvinyl alcohol.

13. The ink jet recording sheet of claim 1 wherein the ink-absorptive layer comprises boric acids or salts thereof.

* * * * *